US010313180B2

(12) United States Patent
Anumala

(10) Patent No.: US 10,313,180 B2
(45) Date of Patent: Jun. 4, 2019

(54) SYSTEMS AND METHODS FOR MANAGING SWITCHING DEVICES IN AN INFORMATION HANDLING SYSTEM

(71) Applicant: Dell Products L.P., Round Rock, TX (US)

(72) Inventor: Mohnish Anumala, Cupertino, CA (US)

(73) Assignee: Dell Products L.P., Round Rock, TX (US)

( * ) Notice: Subject to any disclaimer, the term of this patent is extended or adjusted under 35 U.S.C. 154(b) by 637 days.

(21) Appl. No.: 13/800,875

(22) Filed: Mar. 13, 2013

(65) Prior Publication Data

US 2014/0269252 A1  Sep. 18, 2014

(51) Int. Cl.
*H04L 1/00* (2006.01)
*H04L 12/24* (2006.01)

(52) U.S. Cl.
CPC ...... *H04L 41/0672* (2013.01); *H04L 41/0813* (2013.01); *H04L 41/0866* (2013.01)

(58) Field of Classification Search
None
See application file for complete search history.

(56) References Cited

U.S. PATENT DOCUMENTS

| 2002/0143928 | A1* | 10/2002 | Maltz | H04L 29/06 709/224 |
| 2003/0179703 | A1* | 9/2003 | Levy | H04L 41/06 370/230 |
| 2005/0251799 | A1* | 11/2005 | Wang | G06F 8/65 717/168 |
| 2006/0182034 | A1* | 8/2006 | Klinker | H04L 43/00 370/238 |
| 2007/0064715 | A1* | 3/2007 | Lloyd | H04L 41/0816 370/401 |
| 2007/0250625 | A1* | 10/2007 | Titus | H04L 41/0213 709/224 |
| 2012/0140671 | A1* | 6/2012 | Bukofser | H04L 41/12 370/253 |
| 2012/0147898 | A1* | 6/2012 | Koponen | H04L 41/0893 370/422 |
| 2012/0239822 | A1* | 9/2012 | Poulson | H04L 41/0668 709/239 |

(Continued)

*Primary Examiner* — Kwang B Yao
*Assistant Examiner* — Juvena W Loo
(74) *Attorney, Agent, or Firm* — Haynes and Boone, LLP

(57) ABSTRACT

Systems and methods are provided that allow for the management of switching devices in an information handling system without having to access the switching device. An information handling system as provided herein includes at least one switching device and a controlling device in communication with the at least one switching device. The controlling device includes a network interface component configured to receive a request from the at least one switching device, and one or more processors. The one or more processors are configured to provide configuration settings and an operating system to the at least one switching device in response to the received request, record network traffic of the at least one switching device, provide the recorded traffic to an analytics engine, and debug the at least one switching device based on information received from the analytics engine.

23 Claims, 5 Drawing Sheets

(56) References Cited

U.S. PATENT DOCUMENTS

| | | | |
|---|---|---|---|
| 2013/0074061 A1* | 3/2013 | Averbuch | G06F 8/665 717/171 |
| 2013/0294236 A1* | 11/2013 | Beheshti-Zavareh et al. | 370/235 |
| 2013/0315060 A1* | 11/2013 | Aybay | H04L 49/35 370/230 |
| 2014/0089506 A1* | 3/2014 | Puttaswamy Naga et al. | 709/225 |
| 2014/0192646 A1* | 7/2014 | Mir | H04L 43/0829 370/235 |
| 2014/0258479 A1* | 9/2014 | Tenginakai | H04L 41/082 709/220 |
| 2018/0052678 A1* | 2/2018 | Chigurapati | G06F 8/65 |

* cited by examiner

SYSTEMS AND METHODS FOR MANAGING SWITCHING DEVICES IN AN INFORMATION HANDLING SYSTEM

BACKGROUND

Technical Field

Embodiments disclosed herein are related to systems and methods for managing switching devices in an information handling system. In particular, embodiments disclosed herein provide systems and methods for managing switching devices in an information handling system that allow for the switching devices to be managed by a controller that automatically and/or with user input manages the switching devices without the need to access the switching devices.

Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching devices that make forwarding decisions in order to deliver packets of information from a source system or first network node to a destination system or second network node. Due to the size, complexity, and dynamic nature of these networks, sophisticated network switching devices are often required to continuously make forwarding decisions and to update forwarding and/or flow processing information as network configurations change. Some information handling systems use a software to facilitate the management of the switching devices by making forwarding decisions, and update the forwarding and flow processing. However, existing software-based switching device management still requires the need to access and monitor the switching device in order to monitor the connectivity of the switching device to a controller that implements the software-based management. Consequently, there is a need for systems and methods for managing a switching device that can allow the switching device to be managed throughout its lifetime from a controller, without the need to access the switching device.

Figure 1:
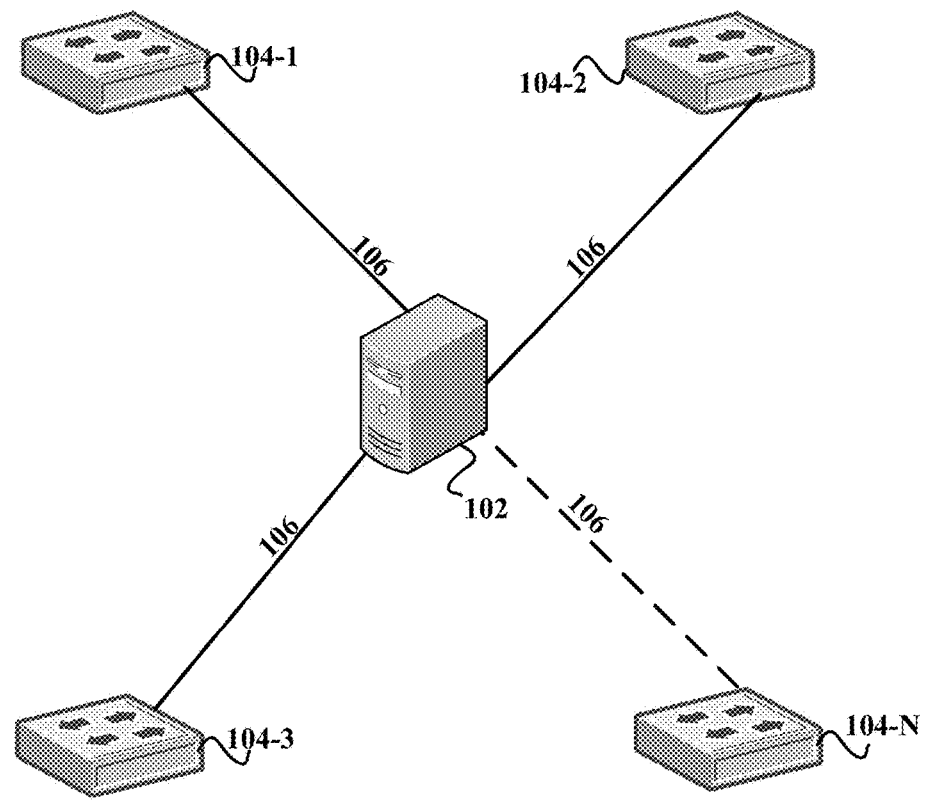
FIG. 1 is a diagram illustrating an information handling system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Consistent with some embodiments, there is provided an information handling system as provided herein that includes at least one switching device and a controlling device in communication with the at least one switching device. The controlling device includes a network interface component configured to receive a request from the at least one switching device, and one or more processors. The one or more processors are configured to provide configuration settings and an operating system to the at least one switching device in response to the received request, record network traffic of the at least one switching device, provide the recorded traffic to an analytics engine, and debug the at least one switching device based on information received from the analytics engine. The controller also includes a memory configured to store the address, configuration settings, and operating system.

Consistent with some embodiments, there is also provided a method of managing one or more switching devices in an information handling system. The method includes steps of receiving a request from at least one switching device, providing configuration settings and an operating system to the at least one switching device in response to the request, recording network traffic of the at least one switching device, providing the recorded traffic to an analytics engine, receiving information about the at least one switching device from the analytics engine, and debugging the at least one switching device based on the received information. The provided method may also be embodied in a tangible, non-transient, computer-readable medium.

These and other embodiments will be described in further detail below with respect to the following figures.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a diagram illustrating an information handling system, consistent with some embodiments. As shown in FIG. 1, information handling system 100 includes a controlling device 102 in communication with one or more switching devices 104-1-104-N over communication links 106. Switching devices 104-1-104-N may be referred to as switches 104, switches 104-1-104-N, switching devices 104 or switching devices 104-1-104-N when referring to the collective group of switching devices in system 100. As used herein, components are in communication with each other if they are capable of sending and/or receiving information either directly or indirectly. Consistent with some embodiments, controller 102 may be a server having one or more processors and a memory storing instructions that, when executed by the one or more processors, allow the server to control and manage switching devices 104-1-104-N to, for example, manage a network traffic flow of switching devices 104-1-104-N. Consistent with some embodiments, switching devices 104-1-104-N may be layer 2 (L2) switches, layer 3 (L3) switches, or combination L2/L3 switches.

As described above, controller 102 may include instructions in a memory that, when executed by a processor of controller 102, allows controller 102 to manage switching devices 104-1-104-N, which significantly simplifies the management of switching devices 104-1-104-N. In some embodiments, when any one of switching devices 104-1-104-N comes on line or boots up, it is in communication with controller 102 and may be managed by controller 102. According to some embodiments, information handling system 100 may be a software defined networking (SDN) based system using OpenFlow as an interface for controlling switching devices 104-1-104-N by controller 102. OpenFlow is an L2 communications protocol that provides controller 102 with access to the forwarding plane of switching devices 104-1-104-N, allowing the path of information handled by switching devices 104-1-104-N to be determined by controller 102.

Figure 2:
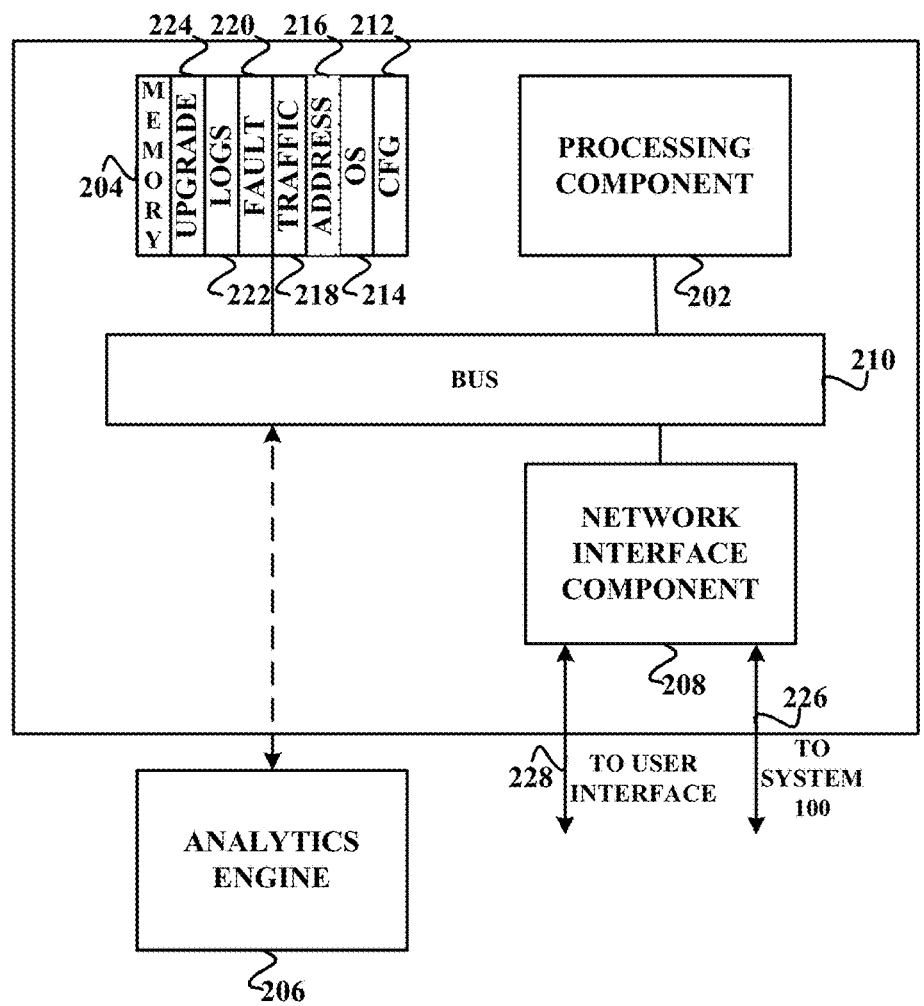
FIG. 2 is a diagram illustrating a controller, consistent with some embodiments.

FIG. 2 is a diagram illustrating a controller, consistent with some embodiments. As shown in FIG. 2, controller 102 includes a processing component 202, a memory 204, a network interface component 206 all coupled to a bus 208 that transmits information between the components. An analytics engine 210 may also be coupled to bus 208 of controller 102. Analytics engine 210 is shown as being separate from and coupled to controller 102 but, in some embodiments, analytics engine 210 may be integrated into controller 102. According to some embodiments, processing component 202 may be one or more processors that are configured to execute instructions stored in memory 204 for controlling switching devices 104-1-104-N in system 100.

As noted above, memory 204 stores instructions that, when executed by the one or more processors of processing component, allow controller 102 to control switching devices 104-1-104-N. Memory 204 may also store additional information related to the control of switching devices 104-1-104-N. For example, memory 204 may store a configuration file 212, and an operating system 214 that may be provided to switching devices 104-1-104-N when switching devices 104-1-104-N come online or boot up, establish communications with controller 102, and send a request to controller 102. Switching devices 104-1-104-N receive configuration file 212 and operating system 214, load configuration file 212 and operating system 214 and are ready to handle information. Consistent with some embodiments, memory may also store an address 216 that may be provided to switching devices 104-1-104-N along with configuration file 212 and operating system 214 when switching devices 104-1-104-N come online or bootup. According to some embodiments, address 216 may be at least one of an internet protocol (IP) address and a media access control (MAC) address, and may be dynamically generated by processing component 202. Consistent with some embodiments, switching devices 104-1-104-N may receive an address, such as address 216, from a separate server (not shown) such as a Dynamic Host Configuration Protocol (DHCP) server.

Memory 204 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

According to some embodiments, memory 204 may store instructions for monitoring and recording a traffic flow of switching devices 104-1-104-N. The recorded traffic 218 may be stored in memory 204 and then provided to analytics engine 210 for analysis. analytics engine 210 may analyze traffic 218 for information about the status and operation of switching devices 104-1-104-N. According to some embodiments, processing component 202 in combination with analytics engine 210 may utilize the sFlow protocol to sample and analyze the network traffic flow of switching devices 104-1-104-N. Processing component 202 may be further configured to debug switching devices 104-1-104-N to manage traffic flow and correct noted problems in the traffic flow. Consistent with some embodiments, analytics engine 210 may analyze traffic 218 and provide information about traffic 218 to processing component for debugging purposes. According to some embodiments, memory 204 may include instructions for enabling and managing remote port mirroring on switching devices 104-1-104-N for debugging purposes. The remote port mirroring may be enabled according to the remote switching port analyzer (RSPAN) protocol.

According to some embodiments, controller 102 may receive fault alerts from switching devices 104-1-104-N and processing component 202 may execute instructions 220 stored in memory 204 for analyzing the receive fault alerts, identifying the fault, and handling the fault. The fault handling may be automatically performed by controller 102, or may be handled by a user interacting with controller 102 through a user interface.

Controller 102 may also be configured for receiving log messages from switching devices 104-1-104-N. The received log messages may be stored 222 in memory 204 and may be analyzed by processing component 202 or analytics engine for use in fault handling and debugging. Controller may further be configured for upgrading switching devices 104-1-104-N. Consistent with some embodiments, memory 204 may store software and/or firmware 224 for upgrading switching devices 104-1-104-N. When performing upgrades, processing component 202 may be configured to analyze a topology and a network flow of system 100 to determine which switching device of switching devices 104-1-104-N to send the upgraded software and/or firmware to and when to send it so that information loss is minimized.

As also shown in FIG. 2, network interface component 206 that includes at a communication link 226 to system 100, and a communication link 228 to a user interface. Although communication link 226 to system 100 is shown as only one link in FIG. 2, network interface component 226 of controller 102 may have N communication links 226 to system 100, one for each switching device 104-1-104-N controller 102 is in communication with. Consistent with some embodiments, communication link 226 to system 100 may correspond to communication link 106 shown in FIG. 1. Communication link 228 to user interface may allow a user, such as a network administrator, to interact with controller 102 either directly or through a terminal in communication with controller 102 to assist in the management of switching devices 104-1-104-N. Consistent with some embodiments, a user may load instructions into memory 204 over communication link 228, the instructions including instructions for managing switching devices 104-1-104-N, configuration file 212, address 216, operating system 214, and upgrades 224. Further, a user communicating with controller 102 over communication link 228 may be able to manually take part in the management of switching devices 104-1-104-N by, for example, reviewing traffic 218, reviewing analytics information provided by analytics engine 210, reviewing logs 222 and faults 220 to assist in fault handling procedures. According to some embodiments, a user in communication with controller 102 over communication link 228 to user interface may be capable of implementing a framework for managing switching devices 104-1-104-N without having to access or otherwise directly interact with switching devices 104-1-104-N.

Figure 3:
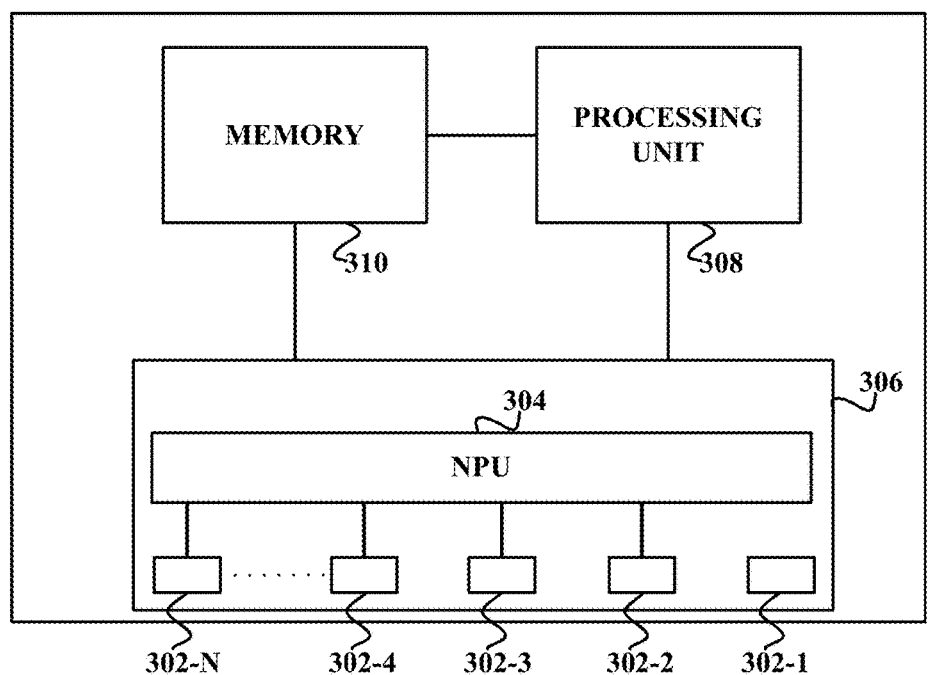
FIG. 3 is a diagram illustrating a switching device, consistent with some embodiments.

FIG. 3 is a diagram illustrating a switching device, consistent with some embodiments. Switching device 104 may correspond to any of switching devices 104-1-104-N shown in FIG. 1. Moreover, switching device 104 may correspond to a switch, such as an L2 switch, an L3 switch, or a combination switch capable of performing both L2 and L3 switching. As shown in FIG. 3, switching device 104 includes a plurality of ports 302-1-302-N (collectively referred to as ports 302) coupled to a network processing unit (NPU) 304, which are both part of a network interface component 306. Network interface component 306 is coupled to a processing unit 308 and a memory 310. Processing unit 308 is also coupled to memory 310, and may include one or more processors that are capable of executing instructions stored in memory 310 for switching and routing information, for example. Ports 302 may be in communication with controller 102 and other devices in information handling system 100 and may each include one or more processors capable of executing instructions stored in a memory for forwarding information in system 100.

As noted above, memory 310 may include instructions that, when executed by processing unit 308, allows switching device 104 to switch and route information. Such instructions may include a configuration file and an operating system received from controller 102. Memory 310 may also store an address that is provided by controller 102 or a separate DHCP server. Switching device 104 may be configured to provide system logs, traffic flow, and fault alerts to controller 102 for use by controller 102 in analytics and debugging. Debugging may include the enabling of remote port mirroring by controller. Furthermore, the components of switching device 104, such as network interface component 306, processing unit 308, and memory 310, may be accessible by controller for management of switching device 104 and the debugging of switching device 104. Memory 310 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 4:
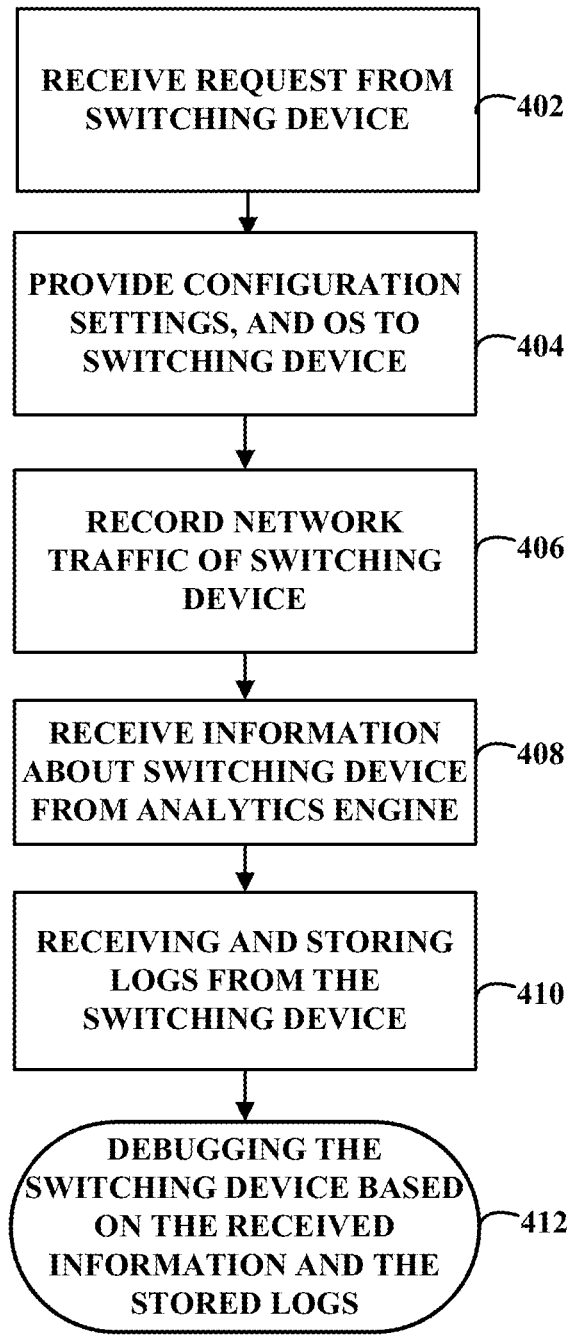
FIG. 4 is a flowchart illustrating a method for managing one or more switching devices in an information handling system, consistent with some embodiments.

FIG. 4 is a flowchart illustrating a method for managing one or more switching devices in an information handling system, consistent with some embodiments. For the purpose illustration, the method shown in FIG. 4 may be described with reference to any of FIGS. 1-3. The method shown in FIG. 4 may be embodied in non-transient, tangible, computer-readable media, such as memory 204, and may be executed by processing component 202 for the purpose of performing the method. As shown in FIG. 4, controller 102 may receive a request from a switching device 104 (402). Consistent with some embodiments, the request may be a request for a configuration file 212, and an operating system 214, that switching device 104 sends to controller 102 when switching device 104 comes online or otherwise boots up. Controller 102 may then provide a configuration file 212, and an operating system 214 from memory 204 to switching device 104 (404). Consistent with some embodiments, controller 102 may also provide address 216 to switching device 104, while in other embodiments, a DHCP server may provide an address to switching device 102. According to some embodiments, address 216 may be an IP address and/or a MAC address. Controller 102 may then record the traffic of switching device 104 (406). Consistent with some embodiments, the recorded traffic may be stored 218 in memory 204. The stored recorded traffic 218 may then be provided to analytics engine 210 for automated analysis and/or analysis by a user such as a network administrator. Processing component 202 may then receive information about switching device 104 from analytics engine 210 (408). Such information may include analysis regarding the recorded traffic, and any problems, faults, dropped information, or other issues with the flow of traffic at switching device 104. Controller 102 may also receive system logs from switching device 104 and store the logs at 222 in memory 204 (410). Controller 102 may then debug switching device 104 based on the information received from analytics engine 210 and the stored logs 222 (412). Consequently, controller 102 is configured to manage switching devices 104-1-104-N, including monitoring the traffic flow and debugging switching devices 104-1-104-N without the need for a user such as a network administrator to access switching devices 104-1-104-N.

Figure 5:
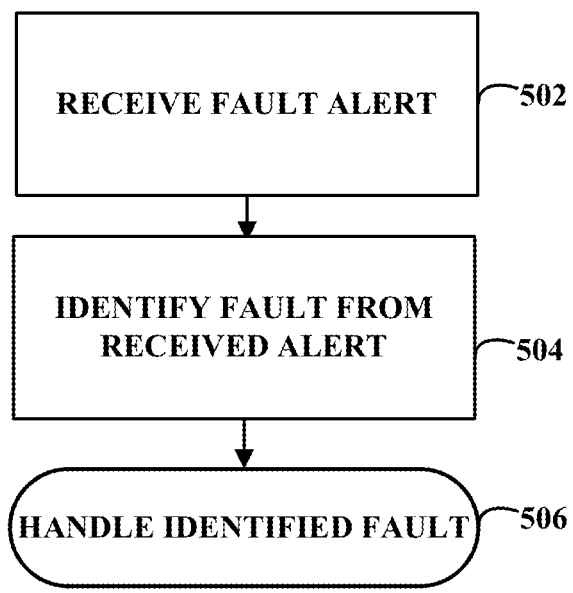
FIG. 5 is a flowchart illustrating a method for handling faults in one or more switching devices in an information handling system, consistent with some embodiments.

FIG. 5 is a flowchart illustrating a method for handling faults in one or more switching devices in an information handling system, consistent with some embodiments. For the purpose illustration, the method shown in FIG. 5 may be described with reference to any of FIGS. 1-3. The method shown in FIG. 5 may be embodied in non-transient, tangible, computer-readable media, such as memory 204, and may be executed by processing component 202 for the purpose of performing the method. As shown in FIG. 5, controller 102 may receive a fault alert from switching device 104-1-104-N (502). The received fault may be stored in memory 204, and may be received from switching device 104-1-104-N by network interface component 206. Processing component 202 may analyze the received fault to identify the fault based on instructions stored in memory 204 at 220 (504). Once the fault has been identified, processing component 202 may execute instructions stored in memory 204 to automatically handle the identified fault (506). According to some embodiments, a user such as a network administrator may handle the fault by accessing controller 102 over connection link 228 to user interface. Consequently, controller 102 may be configured to automatically or, with the assistance of a user such as a network administrator, handle any faults of switching device 104-1-104-N without the need to access a switching device 104-1-104-N.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide systems and methods for managing one or more switching devices in an information handling system. In particular, systems and methods provided herein may manage one or more switching devices in an information handling system at the controller only, without the need to access the switching devices throughout their lifetime. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system, comprising:
   a plurality of switching devices configured to forward information through a network; and
   a controlling device in communication with the plurality of switching devices, the controlling device comprising:
      one or more processors configured to upgrade firmware of the plurality of switching devices by performing operations comprising:
         analyzing a topology of the information handling system and the plurality of switching devices;
         analyzing a flow of the forwarded information through the network;
         minimizing loss of the forwarded information associated with upgrading the firmware based on at least:
            determining, automatically without a user having to access the plurality of switching devices and based on analyzing the flow of the forwarded information through the network and on analyzing the topology of the information handling system and the plurality of switching devices, a first switching device among the plurality of switching devices to send upgraded firmware to; and
            determining, automatically without a user having to access the plurality of switching devices and based on analyzing the flow of the forwarded information through the network and on analyzing the topology of the information handling system and the plurality of switching devices, when to send the upgraded firmware to the first switching device; and
         sending the upgraded firmware to the first switching device.

2. The information handling system of claim 1, wherein the one or more processors are further configured to enable port mirroring on the plurality of switching devices.

3. The information handling system of claim 1, wherein the one or more processors are further configured to:
   receive fault alerts from the plurality of switching devices;
   identify one or more faults from the received fault alerts; and
   execute stored instructions to automatically handle the identified one or more faults.

4. The information handling system of claim 1, wherein:
   the one or more processors are further configured to receive log messages from the plurality of switching devices.

5. The information handling system of claim 1, wherein the one or more processors are further configured to:
   record network traffic of the plurality of switching devices;
   provide the recorded network traffic to an analytics engine; and
   debug the plurality of switching devices based on information received from the analytics engine.

6. The information handling system of claim 1, wherein:
   at least one of the plurality of switching devices comprises:
      a second memory; and
      one or more second processors; and
      the controlling device is capable of accessing the second memory and one or more second processors of the at least one of the plurality of switching devices.

7. The information handling system of claim 1, wherein the upgraded firmware is stored in memory by a user.

8. The information handling system of claim 1, wherein the information handling system comprises a software-defined networking system.

9. A method of upgrading firmware of a plurality of switching devices in an information handling system, comprising:
   analyzing a topology of the information handling system and the plurality of switching devices;
   analyzing a flow of information being forwarded through the plurality of switching devices;
   minimizing loss of the forwarded information associated with upgrading the firmware based on at least:
      determining, automatically without a user having to access the plurality of switching devices and based on analyzing the flow of the forwarded information and on analyzing a topology of the information handling system and the plurality of switching devices, a first switching device among the plurality of switching devices to send upgraded firmware to; and
      determining, automatically without a user having to access the plurality of switching devices and based on analyzing the flow of the forwarded information and on analyzing a topology of the information handling system and the plurality of switching devices, when to send the upgraded firmware to the first switching device; and sending the upgraded firmware to the first switching device.

10. The method of claim 9, further comprising enabling port mirroring on the plurality of switching devices.

11. The method of claim 9, further comprising:
receiving fault alerts from the plurality of switching devices;
identifying a fault from the received fault alerts; and
executing stored instructions to automatically handle the identified fault.

12. The method of claim 9, further comprising receiving log messages from the plurality of switching devices and storing the received log messages.

13. The method of claim 9, further comprising:
recording network traffic of the plurality of switching devices;
providing the recorded network traffic to an analytics engine;
receiving information about at least one switching device among the plurality of switching devices from the analytics engine; and
debugging the at least one switching device based on the received information.

14. The method of claim 9, further comprising accessing internal components of the plurality of switching devices for managing the plurality of switching devices.

15. The method of claim 9, wherein the upgraded firmware is stored in a memory by a user.

16. A non-transitory computer-readable medium including instructions that when executed by one or more processors of a controlling device of an information handling system, causes the controlling device to perform a method for upgrading firmware of a plurality of switching devices in the information handling system, the method comprising:
analyzing a topology of the information handling system and the plurality of switching devices;
analyzing a flow of forwarded information through the plurality of switching devices;
minimizing loss of the forwarded information associated with upgrading the firmware based on at least:
determining, automatically without a user having to access the plurality of switching devices and based on analyzing the flow of the forwarded information and on analyzing a topology of the information handling system and the plurality of switching devices, a first switching device among the plurality of switching devices to send upgraded firmware to; and
determining, automatically without a user having to access the plurality of switching devices and based on analyzing the flow of the forwarded information and on analyzing a topology of the information handling system and the plurality of switching devices, when to send the upgraded firmware to the first switching device; and
sending the upgraded firmware to the first switching device.

17. The non-transitory computer-readable medium of claim 16, wherein the method further comprises enabling port mirroring on at least one switching device among the plurality of switching devices.

18. The non-transitory computer-readable medium of claim 16, wherein the method further comprises:
receiving fault alerts from at least one switching device among the plurality of switching devices;
identifying a fault from the received fault alerts; and
executing stored instructions to automatically handle the identified fault.

19. The non-transitory computer-readable medium of claim 16, wherein the method further comprises receiving log messages from at least one switching device among the plurality of switching devices and storing the received log messages.

20. The non-transitory computer-readable medium of claim 16, wherein the method further comprises:
recording network traffic of the plurality of switching devices;
providing the recorded network traffic to an analytics engine;
receiving information about at least one switching device among the plurality of switching devices from the analytics engine; and
debugging the at least one switching device based on the received information.

21. The non-transitory computer-readable medium of claim 16, wherein the method further comprises accessing internal components of the plurality of switching devices for managing the plurality of switching devices.

22. The non-transitory computer-readable medium of claim 16, wherein the upgraded firmware is stored in a memory by a user.

23. The non-transitory computer-readable medium of claim 16, wherein upgrading the firmware of the plurality of switching devices comprises managing the plurality of switching devices using software defined networking.

* * * * *